United States Patent [19]
Kim et al.

[11] Patent Number: 5,900,966
[45] Date of Patent: May 4, 1999

[54] ACOUSTIC-OPTIC MODULATOR HAVING TWO TRANSDUCERS

[75] Inventors: Yong-hoon Kim, Sungnam; Hang-woo Lee, Kunpo, both of Rep. of Korea

[73] Assignee: Samsung Electronics Co., Ltd., Suwon, Rep. of Korea

[21] Appl. No.: 08/911,700

[22] Filed: Aug. 15, 1997

[30] Foreign Application Priority Data

Oct. 28, 1996 [KR] Rep. of Korea ........................ 96-49310

[51] Int. Cl.$^6$ ........................................................ G02F 1/33
[52] U.S. Cl. ........................ 359/311; 359/305; 359/285; 359/323
[58] Field of Search ..................................... 359/322, 305, 359/311, 285, 287, 323; 250/338.5, 339.12, 339.13; 356/300, 349

[56] References Cited

U.S. PATENT DOCUMENTS

| | | | |
|---|---|---|---|
| 4,516,838 | 5/1985 | Bademian | 359/311 |
| 4,638,266 | 1/1987 | Auch et al. | 359/311 |
| 4,867,543 | 9/1989 | Bennion et al. | 359/323 |
| 5,002,349 | 3/1991 | Cheung et al. | 359/285 |
| 5,002,395 | 3/1991 | Shah | 359/305 |
| 5,083,856 | 1/1992 | Hatori et al. | 359/305 |

*Primary Examiner*—Loha Ben
*Attorney, Agent, or Firm*—Foley & Lardner

[57] ABSTRACT

An acousto-optic modulator having an ultrasonic medium for controlling light from a light source by diffracting the light and a transducer portion having electrodes for generating an acoustic wave in the ultrasonic medium, wherein the transducer portion includes two transducers each having an electrode. The AOM is provided with two electrodes by using two transducers, thereby facilitating impedance matching with a driver. The two transducers may be installed so that their polarization directions are opposite to each other, thereby obtaining maximum power transfer to the ultrasonic medium.

10 Claims, 3 Drawing Sheets

ACOUSTIC-OPTIC MODULATOR HAVING TWO TRANSDUCERS

BACKGROUND OF THE INVENTION

1. Field of the Invention

The present invention relates to an acousto-optic modulator, and more particularly, to an acousto-optic modulator having two transducers for facilitating impedance matching.

2. Description of Background Art

Various display technologies have been developed to meet the increasing demand for multimedia applications. However, well known conventional devices such as cathode ray tubes (CRTs) or liquid crystal displays (CDs) have not provided satisfactory performance in large screen applications due to manufacturing difficulties and because of their poor resolution. Conventional large screen video projection devices suffer similar disadvantages because they also utilize CRTs or LCDs.

An alternative video system utilizes a laser projector for projecting video information directly onto a screen. The advantages of the laser projector in large screen applications include a large display area, high contrast, high light efficiency, minimal distortion and color errors, the ability to provide luminance and contrast irrespective of projection distance, and compatibility with large-screen HDTV (High Definition Television) format. Laser projectors generally employ either a xenon (Xe) lamp, a helium-neon (He-Ne) laser, an argon (Ar) laser or a krypton-argon (Kr-Ar) laser as a light source. Amongst these light sources, focus has been placed on the Kr-Ar laser for its ability to simplify the projection system.

In general, a laser projection system has a light generator, a light modulator, a video signal generator, a scanner and a screen. A beam generated by the laser generator is directed through the light modulator, which modulates the incident beam in accordance with a video signal supplied by the video signal generator. The modulator operates to load pixel information onto the beam. The modulated beam is scanned onto the screen by the scanner, thereby displaying a picture on the screen.

Generally, three types of light modulators are known for laser projection systems: an acousto-optic modulator (AOM), an electro-optic modulator (EOM), and an acoustooptic tunable filter (AOTF). Among them, the AOM is the most widely used, and the driving circuit thereof is simple. For large screen displays, the conventional light modulating system uses three AOMs in conjunction with a high power laser beam. The AOMs used in such systems generally have a structure that can provide sustained operation at high power.

A conventional AOM is shown in FIG. 1. Referring to FIG. 1, the conventional AOM has a transducer 12 for generating acoustic waves by an electrode 14 in one side of an ultrasonic medium 10. The transducer 12 is coupled to the ultrasonic medium 10 by an adhesion layer 13 having a silver (Ag) layer, and an electrode 14 made of gold (Au) is installed on the transducer 12. The transducer 12 is thus constructed in such a way that it is interposed between the electrode 14 and the adhesion layer 13 and serves as a capacitor.

An acoustic wave absorbing medium (not shown) is provided at the opposite side of the transducer 12 to prevent reflection of ultrasonic waves back through the medium 10. Laser light enters the ultrasonic medium 10 at surface 10A and is emitted from the medium at surface 10B. Surfaces 10A and 10B are optically abraded. Since the ultrasonic medium 10 has a large refractive index, much of the reflected laser light that enters through the light receiving surface 10A and is emitted through light emitting surface 10B is lost. Thus, a film that prevents laser light reflection is generally deposited on the light receiving and emitting surfaces 10A and 10B.

FIG. 2 is a plan view of the electrode 14 of a transducer 12 of a conventional AOM. Referring to FIG. 2, the electrode 14 comprises a single element. Assuming that the length (1) of the electrode 14 is 10 mm and the average height thereof $(h_1+h_2)/2$ is 0.55 mm, the sectional surface area (A) of the electrode 14 is 5.5 mm$^2$.

To use the AOM together with a driver, an impedance matching operation must be performed. The goals of the impedance matching operation are to compensate for frequency mismatch resulting from a thickness error of a transducer so that the transducer will resonate at the driver frequency, and to optimize the transfer of RF power by matching the impedance of the driver and transducer.

As explained below, in the case where a conventional driver having a conventional driver impedance ($R_s$) of 50 Ω is used to drive an AOM at 150 MHZ, conventional AOMs are not able to match the 50 Ω driver impedance. As a result, conventional AOMs are not able to provide efficient transfer of RF power. Accordingly, there is a need for an acousto-optic modulator (AOM) for laser projection display systems that provides superior impedance matching.

SUMMARY OF THE INVENTION

To overcome the problems of conventional AOM technology discussed above, it is an object of the present invention to provide a 150 MHz acousto-optic modulator (AOM) for a laser projection display (LPD) system that provides superior impedance matching.

This object is accomplished in the present invention by providing an AOM which comprises an ultrasonic medium for controlling light from a light source by diffracting the light and a transducer portion comprising two transducers having corresponding electrodes for generating an acoustic wave in the medium. The ultrasonic medium is preferably composed of a tellurium oxide (TeO$_2$) single crystal. It is also preferable that the transducers are each composed of a lithium niobium trioxide (LiNbO$_3$) single crystal and the electrodes are composed of gold (Au).

It is preferable that the transducers are positioned such that their polarization directions oppose each other, and that the area of each electrode is between 2.4 and 2.8 mm$^2$ when an impedance of 50 Ω is required.

It is a further object of the present invention to provide a laser projection system comprising a laser light generator, a video signal generator, an acousto-optic modulator for modulating light from the laser light generator in accordance with a video signal from the video signal generator, the modulator having an ultrasonic medium for diffracting the light, a transducer portion having two transducers for generating an acoustic wave in the ultrasonic medium, each transducer having a corresponding electrode; and a scanner for scanning modulated light from the light modulator onto a surface.

BRIEF DESCRIPTION OF THE DRAWINGS

The above objects and advantages of the present invention will be further understood through reference to the following detailed description of a preferred embodiment and the attached drawings in which.

DETAILED DESCRIPTION OF THE PREFERRED EMBODIMENT

A preferred embodiment of the present invention will now be described in detail with reference to the accompanying drawings.

Generally, the relationship between impedance ($R_s$) and capacitance ($C_0$) in an AOM can be expressed using the following formula (1):

$$R_s = \frac{1}{\omega_0 \cdot C_0} \quad (1)$$

where $\omega_0$ is the angular frequency and is represented by $\omega_0 = 2\pi f_0$ ($f_0 = 1.1 \times f_s$). Here, $f_s$ is the central frequency and corresponds to 150 MHz in the case of a 150 MHz AOM.

The relationship between capacitance $C_0$ and the area (A) of an electrode is expressed in the following formula (2):

$$C_0 = \frac{\varepsilon_0 \varepsilon_r A}{l} \quad (2)$$

where $\epsilon_0$ is the dielectric constant in a vacuum state and is represented by $\epsilon_0 = 8.8542 \times 10^{-12}$ F/m, $\epsilon_r$ is the relative dielectric constant of a dielectric film and corresponds to 38.6 in the case of a transducer composed of an LN (LiNbO$_3$) single crystal of 36° Y cut, and l is the distance between electrodes, that is, the thickness of the dielectric body, and is represented by $1 = V/2f_0$. Here, V is the sonic wave velocity in an LN single crystal and corresponds to 7300 m/s in the case of a transducer composed of the LN single crystal of 36° Y cut.

In accordance with the relationships expressed in formula (1) and formula (2), the sectional surface area of the electrode for producing an impedance of 50 Ω can be obtained with respect to a given length of the electrode. Similarly, the impedance can be calculated from the sectional surface area of the electrode.

Figure 1:
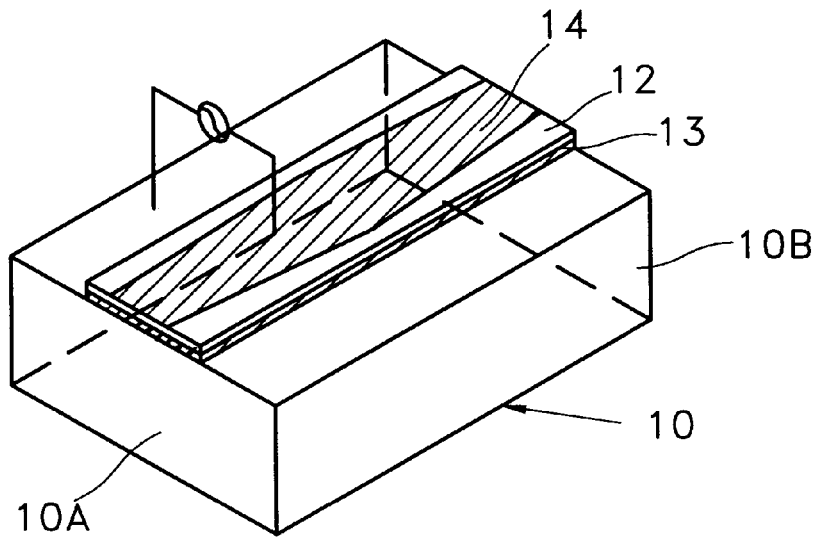
FIG. 1 is a schematic, perspective view of a conventional AOM.
Figure 2:
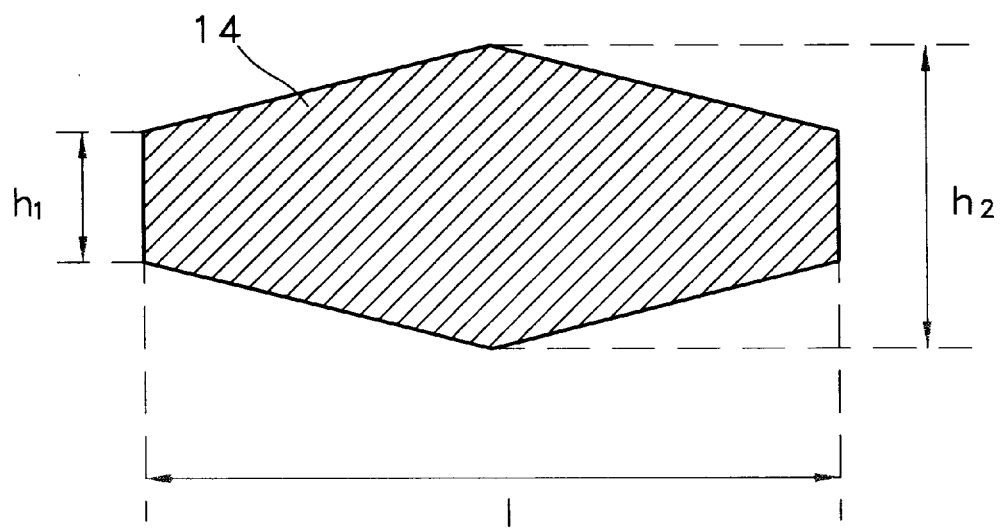
FIG. 2 is a plan view of an electrode formed on a transducer of the conventional AOM.

From the relationships described above, the impedance in the conventional AOM having an electrode as shown in FIG. 2 is 11.3 Ω. In other words, in the case of the conventional AOM using a single transducer, the impedance is significantly different from the desired impedance of 50 Ω, and this different impedance is unfavorable for impedance matching between the AOM and the driver, thereby making efficient transfer of RF power difficult.

Figure 3:
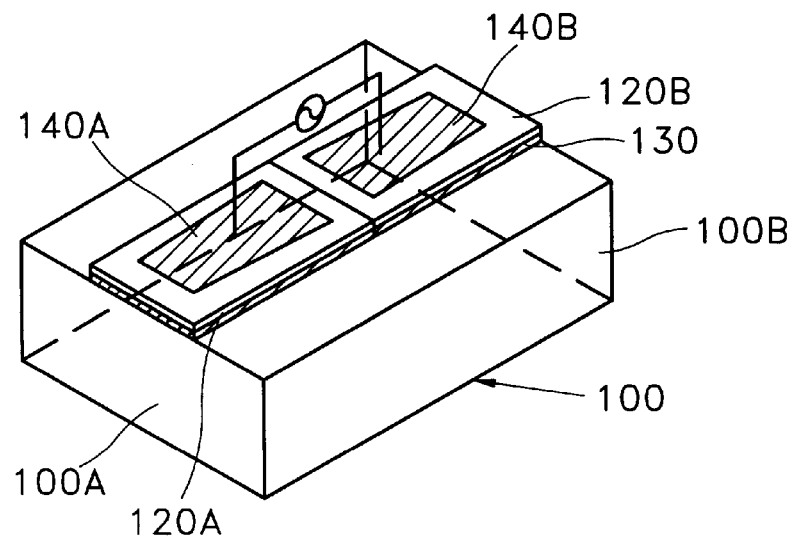
FIG. 3 is a schematic, perspective view of an AOM according to a preferred embodiment of the present invention.

FIG. 3 is a schematic, perspective view of an AOM in accordance with a preferred embodiment of the present invention. Referring to FIG. 3, the AOM according to a preferred embodiment of the present invention includes an ultrasonic medium 100 for controlling laser light through diffraction, and two transducers 120A and 120B that are provided on one side of the ultrasonic medium 100. The two transducers 120A and 120B have respective electrodes 140A and 140B for generating acoustic waves. In other words, each of the transducers 120A and 120B has an electrode 140A or 140B, respectively. Each of the electrodes 140A and 140B is preferably composed of gold (Au). The transducers 120A and 120B are coupled to the ultrasonic medium 100 by a conductive adhesion layer 130 having a silver (Ag) layer. Therefore, the transducers 120A and 120B are respectively interposed between the electrodes 140A and 140B and the adhesion layer 130 and function or act as two capacitors connected in series.

The ultrasonic medium 100 is preferably composed of a TeO$_2$ single crystal, and the transducers 120A and 120B are each composed of an LN single crystal.

To manufacture the AOM having the aforementioned construction according to a preferred embodiment of the present invention, the TeO$_2$ single crystal composing the ultrasonic medium 100 is manufactured such that the surface thereof on which the transducers 120A and 120B are fixed is polished in the [001] direction, and entering/emitting surfaces 100A and 100B through which light passes are polished in the [010] or [110] direction, respectively. The LN single crystal composing the transducers 120A and 120B is formed using 36° Y cut. The ultrasonic medium 100 and the transducers 120A and 120B are adhered by an adhesion layer 130 having a chromium (Cr) layer, a silver (Ag) layer and an indium (In) layer.

To attain high diffraction efficiency, power transfer to the ultrasonic medium must be maximized. To accomplish this, two transducers 120A and 120B are installed such that their polarization directions are opposite to each other. Accordingly, electrical fields applied to the transducers 120A and 120B exhibit a phase difference of 180° and maximum power transfer is obtained. This occurs because the vibrating direction of particles present in a piezo-electric transducer medium is determined by the relative direction of the applied electrical field and the polarization direction of the piezo-electric material.

The transducers 120A and 120B adhered to the ultrasonic medium 100 are preferably finished to have a thickness of approximately 22 μm, and the electrodes 140A and 140B are composed of gold (Au).

Figure 4:
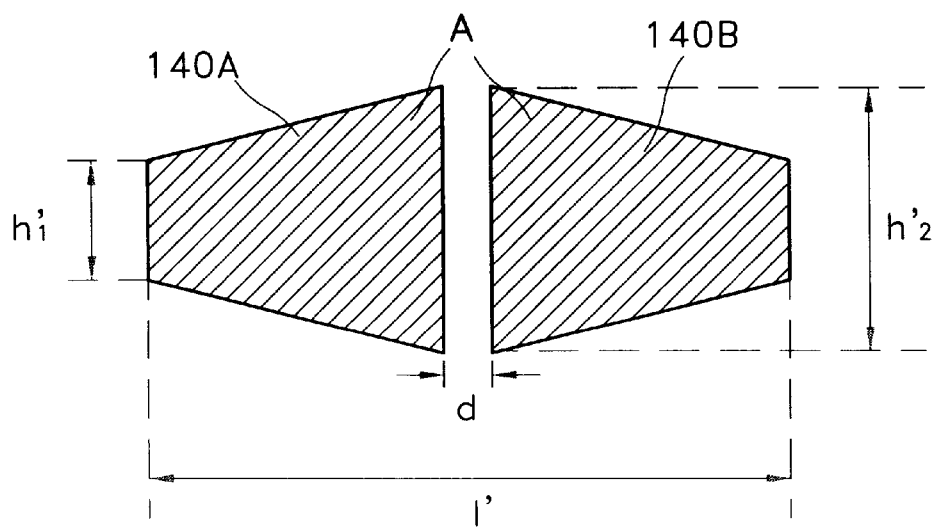
FIG. 4 is a plan view of electrodes formed on transducers of the AOM shown in FIG. 3.

FIG. 4 is a plan view of electrodes formed on transducers of the AOM shown in FIG. 3. Referring to FIG. 4, the AOM according to a preferred embodiment of the present invention is constructed such that the overall length (1') of the electrodes 140A and 10B is 10 mm, the average height is 0.55 mm, and the distance (d) between the electrodes 140A and 140B is 0.5 mm. The sectional surface areas (A) of the electrodes 140A and 140B are 2.6125 mm$^2$, respectively.

Figure 5:
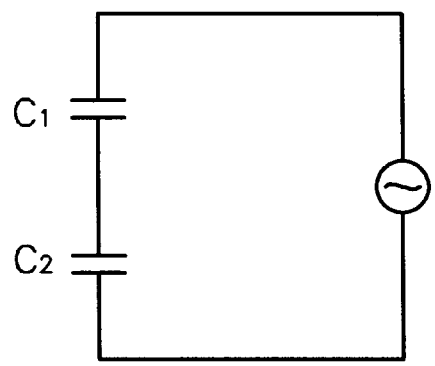
FIG. 5 is an equivalent circuit diagram of an AOM having the electrodes shown in FIG. 4.

FIG. 5 is an equivalent circuit diagram of an AOM having the electrodes shown in FIG. 4. Referring to FIG. 5, the capacitance C, of the electrode shown in FIG. 4 can be represented by the formula:

$$C_t = \frac{C_1 \cdot C_2}{C_1 + C_2}$$

where $C_1 = C_2$ and thus $C_t = C_1/2$. The capacitance $C_1$ or $C_2$ of electrodes 140A and 140B can be obtained by using formula (2). Accordingly, $C_1 = C_2 = 40.6$ pF. Thus, $C_t = 20.3$ pF. Substituting $C_t$ the capacitance $C_0$ of formula (1), it is found that $R_s = 48$ Ω. Thus the transducer impedance is very close to the 50 Ω required for impedance matching and greatly facilitates impedance matching between the AOM and its driver.

The electrode of the AOM according to the present invention is not restricted to the dimensions shown in FIG. 4, but it is preferred that the sectional surface area of each electrode is in a range between 2.4 and 2.8 mm² when an impedance of 50 Ω is required.

Figure 6:
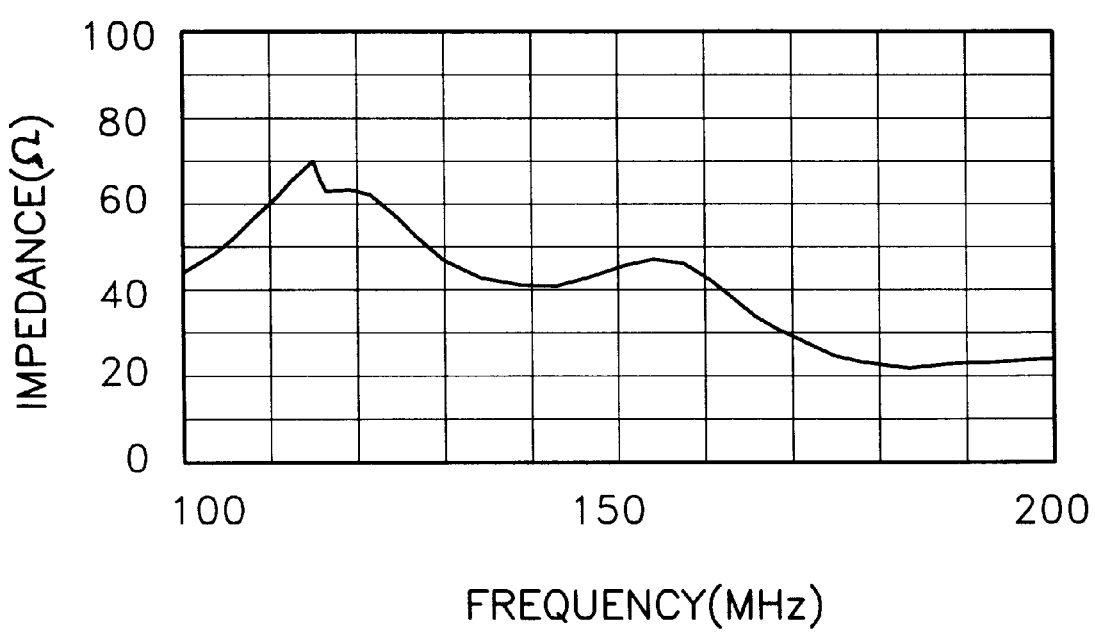
FIG. 6 is a graph showing transducer impedance as a function of driving frequency in an AOM according to a preferred embodiment of the present invention.

FIG. 6 is a graph showing impedance as a function of frequency of a driving signal of an AOM according to a preferred embodiment of the present invention. As seen from FIG. 6, the impedance of the AOM according to the present invention is close to the required impedance level of 50 Ω at the central frequency of 150 MHz.

As described above, the AOM according to the present invention is provided with two electrodes by using two transducers, thereby facilitating impedance matching with a driver. Also, two transducers are installed or positioned so that their polarization directions are opposite to each other, thereby obtaining maximum power transfer. Therefore, the efficiency of the AOM is enhanced.

Although the present invention has been described in detail with reference to an illustrative embodiment, the invention is not limited thereto and various modifications and changes may be effected by one skilled in the art within the scope of the invention.

What is claimed is:

1. An acousto-optic modulator comprising:

an ultrasonic medium for controlling light from a light source by diffracting the light; and a transducer portion for generating an acoustic wave in the ultrasonic medium, the transducer portion comprising two transducers, each having a corresponding electrode, for generating an acoustic wave.

2. The AOM of claim 1, wherein the ultrasonic medium is composed of a TeO₂ single crystal.

3. The AOM of claim 1, wherein each transducer is composed of an LiNbO₃ single crystal and each corresponding electrode is composed of gold.

4. The AOM of claim 1, wherein the transducers are positioned such that their polarization directions oppose each other.

5. The AOM of claim 1, wherein the area of each corresponding electrode is between 2.4 and 2.8 mm².

6. A laser projection system comprising:

a laser light generator;

a video signal generator;

an acousto-optic modulator for modulating light from the laser light generator in accordance with a video signal from the video signal generator, the modulator having an ultrasonic medium for diffracting the light, a transducer portion having two transducers for generating an acoustic wave in the ultrasonic medium, each transducer having a corresponding electrode; and a scanner for scanning modulated light from the light modulator onto a surface.

7. A laser projection system as claimed in claim 6, wherein the ultrasonic medium is composed of a TeO₂ single crystal.

8. A laser projection system as claimed in claim 6, wherein each transducer is composed of an LiNbO₃ single crystal and each corresponding electrode is composed of gold.

9. A laser projection system as claimed in claim 6, wherein the two transducers are positioned such that their polarization directions are opposite to each other.

10. A laser projection system as claimed in claim 6, wherein the area of each corresponding electrode is between 2.4 and 2.8 mm².

* * * * *